Figure 1:
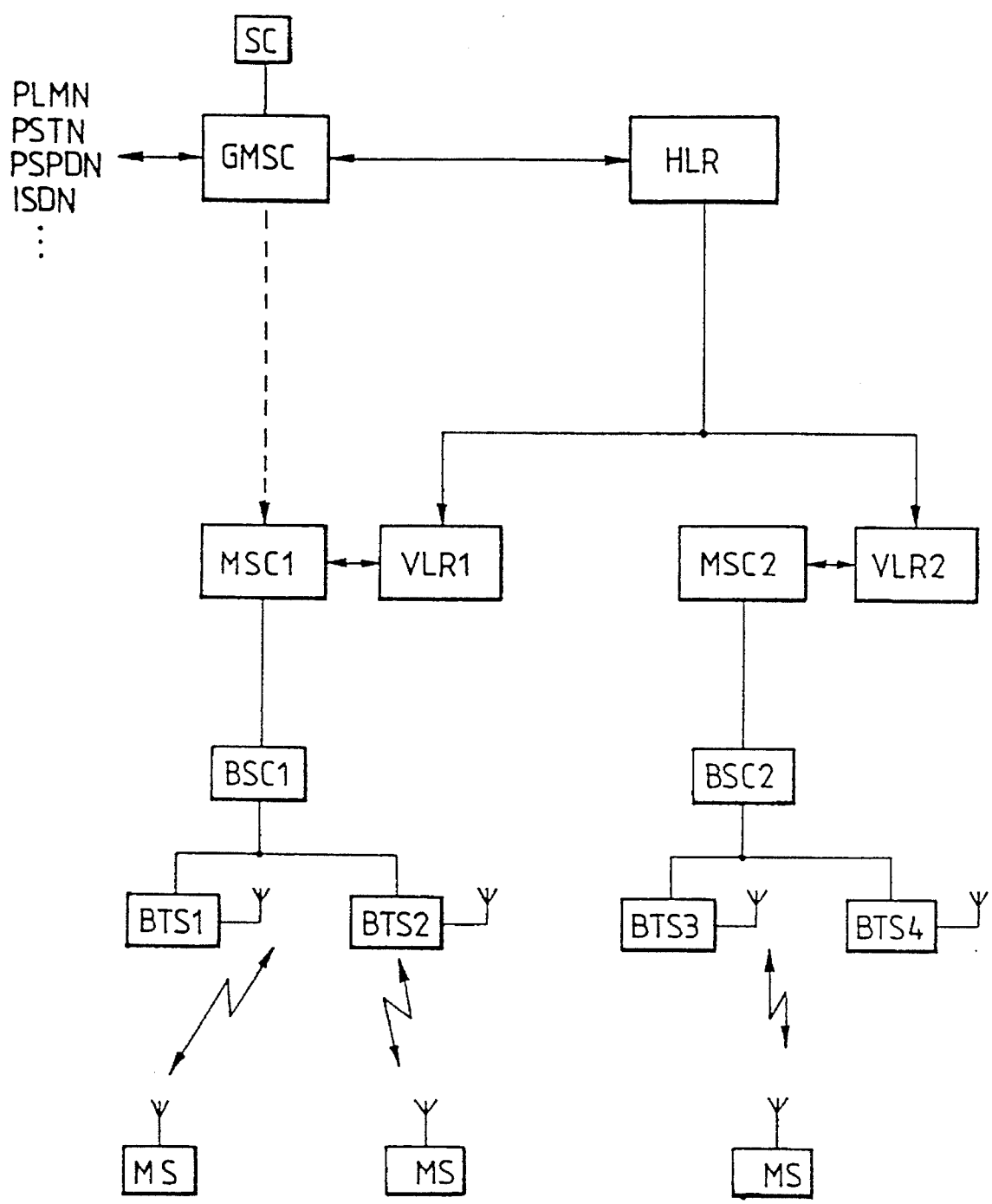

United States Patent [19]

Koivunen

[11] Patent Number: 5,479,481
[45] Date of Patent: Dec. 26, 1995

[54] METHOD FOR UPDATING SUBSCRIBER DATA IN A CELLULAR RADIO SYSTEM AND A CELLULAR RADIO SYSTEM

[75] Inventor: Seppo Koivunen, Hyvinkää, Finland

[73] Assignee: Nokia Telecommunications, Espoo, Finland

[21] Appl. No.: 211,461

[22] PCT Filed: Jul. 21, 1993

[86] PCT No.: PCT/FI93/00303

§ 371 Date: Mar. 31, 1994

§ 102(e) Date: Mar. 31, 1994

[87] PCT Pub. No.: WO94/04006

PCT Pub. Date: Feb. 17, 1994

[30] Foreign Application Priority Data

Aug. 7, 1992 [FI] Finland ................................ 923566

[51] Int. Cl.⁶ ........................................................ H04Q 7/34
[52] U.S. Cl. ........................... 379/59; 379/60; 455/33.1; 455/33.2
[58] Field of Search ....................... 379/59, 60; 455/33.1, 455/33.2

[56] References Cited

U.S. PATENT DOCUMENTS 5,123,111  6/1992  Delory et al. ............................ 379/60

OTHER PUBLICATIONS

"European digital cellular telecommunication system (phase 1); Organization of Subscriber Data", published by European Telecommunications Standards Institute, GSM 03.08, version 3.7.0, Jan. 1991, pp. 1–18.

"Procedures during restoration", GSM 03.07—version 3.2.1, Feb. 1992, pp. 7–10.
"European digital cellular telecommunications system (phase 1); Location Registration Procedures", published by European Telecommunications Standards Institute, GSM 03.12, version 3.3.0, Jun. 1994, pp. 1–9.
"Recommendation GSM 09.02 Mobile Application Part Specification", Jan. 1991, version 3.8.0, pp. 25, 27–29, 35–39, 41, 271–280 and 420.
WO, A1, 9222174 (Telenokia Oy et al.), 11 Dec. 1992, see the whole document.
WO, A1, 8808238 (Motorola Inc), 20 Oct. 1988 p. 3, line 30—p. 5, line 13.
Electrical Communication, 63 (1989): 4, W. Weiss et al, "System 900: The ISDN Approach to Cellular Mobile Radio" pp. 400–408; see the whole document.

*Primary Examiner*—Dwayne D. Bost
*Attorney, Agent, or Firm*—Cushman Darby & Cushman

[57] ABSTRACT

A method for updating subscriber data in a cellular radio system, and a corresponding cellular radio system, in which method a visitor location register (VLR) receives from a home location register (HLR) of the cellular radio system a restart indication (HLR Reset); and changes the restart number (HLR Reset Num) of the home location register which sent the restart indication in the home location register list of the visitor location register; when the visitor location register (VLR) receives from a mobile exchange (MSC) an indication of the establishment of a radio connection with a subscriber (MS), the visitor location register (VLR) compares the subscriber-specific restart number of the subscriber (MS) with the home location register restart number (HLR Reset Num) of the subscriber (MS), and updates the location data of the subscriber on the basis of the comparison.

4 Claims, 2 Drawing Sheets

| HLR Addr | HLR Reset Num |
|---|---|
| HLR Addr | HLR Reset Num |
| | |
| | |
| | | ducted in the cell. The

METHOD FOR UPDATING SUBSCRIBER DATA IN A CELLULAR RADIO SYSTEM AND A CELLULAR RADIO SYSTEM

The invention relates to a method for updating subscriber data in a cellular radio system, wherein a visitor location register receives from a home location register of the cellular radio system a home location register restart indication indicating that the home location register has restarted, and to a cellular radio system comprising a subscriber data list containing subscriber data.

Various cellular radio or mobile telephone systems are today used or being developed in which the geographical area covered by the system is divided into smaller separate radio areas or cells, so that when a radio telephone or mobile radio resides in a cell, it communicates with the fixed network through a fixed radio station located in the cell. The mobile radios belonging to the system are allowed to roam freely within the area of the system from one cell to another. Such systems include the digital mobile radio system GSM (Global System for Mobiles).

As is well-known in cellular radio networks, the home location register (HLR) continuously stores the location and subscriber data of mobile radios registered in the network in a memory means, such as a RAM, which data are lost e.g. when the HLR is switched off; and at regular intervals in a non-volatile memory means, such as a hard disk, where the data are stored permanently. When the HLR occasionally has to restart, the location and subscriber data stored in the volatile memory are lost. In such a case, the HLR has to request all visitor location registers (VLR) of the mobile radio network to perform the location updating of the subscribers of the respective HLR in order that the HLR would know the location data of its subscribers. The HLR needs the subscriber location data so as to be able to give the right location of the subscriber to a mobile exchange wanting to forward a call to this particular subscriber. In a prior art solution described in GSM 03.08, February 1992, *Organisation of Subscriber Data*, ETSI/PT 12, the following subscriber-specific data, among others, are stored in the VLR (Table 1 of the above specification): IMSI (International Mobile Subscriber Number, subscriber-specific Radio Confirmation Indicator, described in greater detail in Section 2.7.2.1. of the above specification, HLR Confirmation Indicator, described in greater detail in Section 2.7.2.2., and the HLR address of the subscriber. In this prior art solution the HLR indicates all VLRs in the radio network that it has restarted, which is described in GSM 09.02, January 1991, *Mobile Application Part Specification* DCS, ETSI, Version 3.8.0, FIG. 6.2/9. All VLRs in the cellular radio system that have received the restart indication thereby start to search their own subscriber-specific subscriber and location data lists for the data of the subscribers of the HLR which has sent the restart indication. When the VLR finds the data of the searched subscribers, it sets the Radio Confirmation Indicator and HLR Confirmation Indicator in the subscriber data of these subscribers to a not confirmed state. After the VLR succeeds in establishing a radio connection with a certain subscriber residing in the service area of the VLR, the VLR sets the Radio Confirmation Indicator of this subscriber to a confirmed state. Correspondingly, when the VLR succeeds in updating the location of a certain subscriber (typically as described in GSM 03.12, February 1992, *Location Registration Procedures DCS*, ETSI/PT 12, Section 5.4.2.1.), the VLR sets the HLR Confirmation Indicator of this subscriber to a confirmed state. This is described in greater detail in GSM 09.02, January 1991, *Mobile Application Part Specification DCS*, ETSI, Section 5.8.4., p. 275.

A drawback of the prior art solution is that after the HLR has sent the restart indication to the VLRs of the cellular radio system, all VLRs that have received the indication have to check all of the subscriber data stored in them and compare their HLR address with the address of the HLR which sent the restart indication. If the addresses are identical, the VLRs further have to set the Radio Confirmation Indicator and HLR Confirmation Indicator of the subscribers of the concerned HLR to the not confirmed state, and perform location updating for these subscribers. This process loads the VLR heavily as the checking of the subscriber data and possible location updating of one subscriber may take even one second. Accordingly, if there are e.g. 10,000 subscribers residing in the service area of the VLR, the checking of all subscriber data and possible location updatings take 10,000 seconds for the VLR. Moreover, it is possible that HLR subscriber data which had not yet been stored in the hard disk or in another nonvolatile memory before the restart of the HLR are false. In such a case, the HLR will provide the mobile exchange calling this subscriber with false subscriber location data, as a result of which the call to the subscriber will be forwarded to a wrong mobile exchange, and the subscriber will not be reached.

The object of the present invention is to provide a method and an arrangement by means of which the restart indication given by a HLR is processed in the VLR in a new way which loads the VLR less than previously.

This new method for updating subscriber data in a cellular radio system is characterized in that a subscriber-specific restart number is included in the subscriber data of the visitor location register; a home location register list is included in the visitor location register, each home location register identity having an associated home location register restart number in said home location register list; the visitor location register changes the restart number of the home location register which sent the restart indication in the home location register list of the visitor location register; when the visitor location register receives from a mobile exchange an indication of the establishment of a radio connection with a subscriber, the visitor location register compares the subscriber-specific restart number of the subscriber with the home location register restart number of the subscriber, and initiates the updating of the location data of the subscriber in the home location register if required on the basis of the comparison.

This new cellular radio system is achieved by an arrangement according to the invention, which is characterized in that the subscriber data list contains a subscriber-specific restart number, and that the cellular radio system comprises: a home location register list where the identity of each home location register corresponds to the restart number of the home location register; means for processing the home location register restart indication sent by the home location register and changing the home-location-register-specific restart number included in the home location register list in response to the restart indication sent by the home location register; means for comparing the subscriber-specific restart number included in the subscriber data list with the home-location-register-specific restart number included in the home location register list in response to an indication sent by a mobile exchange so as to indicate that a radio connection has been established with the subscriber, and initiating the updating of the subscriber data of the subscriber in the home location register if required on the basis of the comparison.

The invention is based on the idea that a subscriber-specific restart number is included for each subscriber in the VLR subscriber data, and a HLR list is provided in the VLR in which the identity (e.g. telephone number) of each HLR corresponds to the restart number of this HLR. When a certain HLR sends a restart indication to the VLR, the VLR changes the restart number of the HLR in the HLR list. Then, when the subscriber of the HLR which sent the restart indication establishes a radio connection with the base station of the cellular radio network, the VLR compares the subscriber-specific HLR restart number of the subscriber of this HLR in the subscriber data of the subscriber with the restart number of the HLR. If the numbers are not identical, the VLR initiates updating of the subscriber and location data of this subscriber. The VLR comprises means required for this procedure.

An advantage of the invention is that the VLR need not check the subscriber and location data of all subscribers of a certain HLR within its service area. The VLR or a register performing its functions only has to check the data of subscribers establishing a radio contact with the cellular radio network. The VLR will thus not be loaded as much as in the prior art solution, in addition to which all calls to the subscribers of the HLR will be forwarded to the right subscribers, and, unlike in the prior art solution, no calls will be lost.

Figures 2, 3:
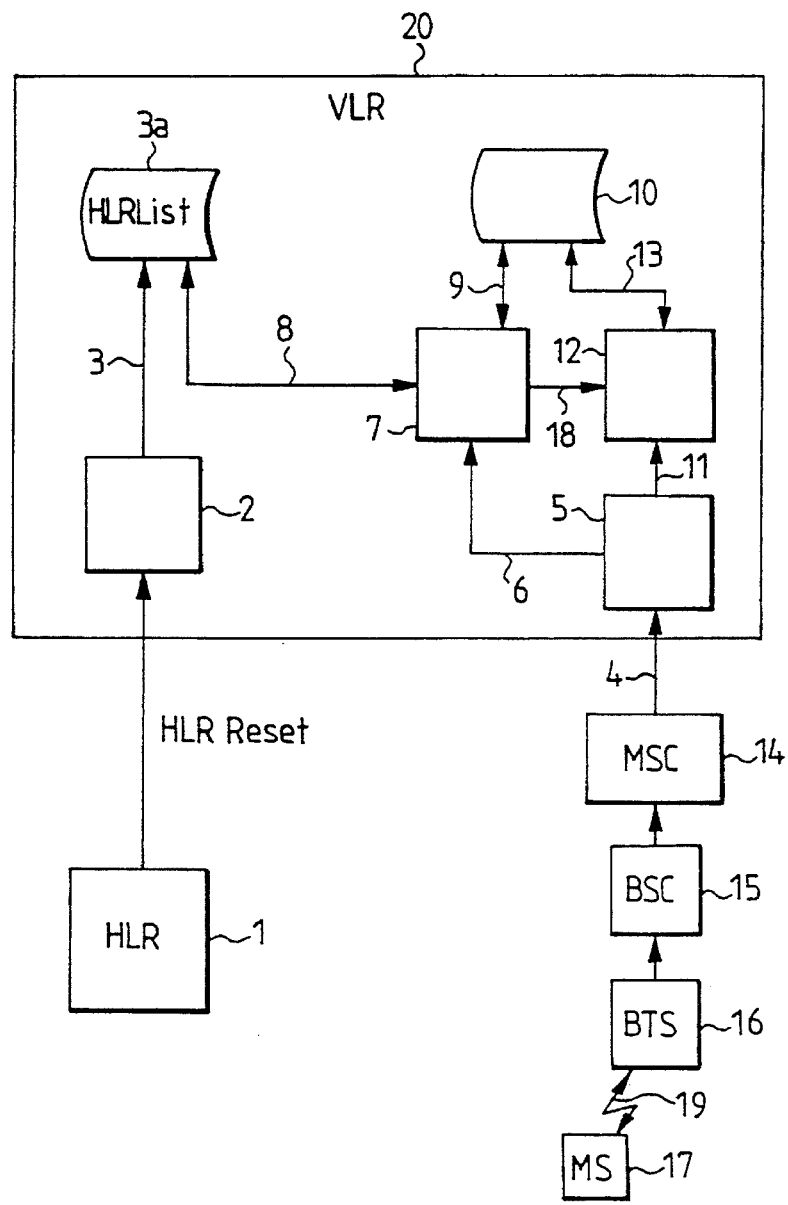

In the following the invention will be described in greater detail with reference to the attached drawings, in which FIG. 1 is a diagram illustrating a cellular radio system in which the method and arrangement according to the invention are applicable;

FIG. 2 shows a HLR list in the VLR of the cellular radio system according to the invention; and FIG. 3 is a detailed diagram illustrating the VLR of the cellular radio system according to the invention.

The method according to the invention will be described below in connection with the digital GSM mobile radio system, which is the primary application area of the invention. However, the method according to the invention may also be applied in other similar radio systems or in the modifications of the GSM system. The basic configuration and basic functions of the GSM mobile radio system are well-known to one skilled in the art and relatively accurately defined in the ETSI specifications of the GSM system, particularly: GSM Recommendations 01.02; 11.30; 11.31; 11.32; 03.40. Referring to FIG. 1, a few basic concepts and elements of the GSM system essential for describing the invention will be clarified in the following. An area where GSM mobile services are available is called a GSM network (GSM service area) which may cover several countries. The GSM network may be divided into national GSM networks, i.e. areas covered by a single operator offering GSM services. There may also be several GSM networks (Public Land Mobile Network (PLMN) service area) in one country, and the areas covered by them may overlap geographically. In the text below the mobile radio system primarily refers to such a "national" mobile radio network, which may be connected to other national mobile radio networks or other data transmission systems, such as a public switched telephone network (PSTN).

The national GSM network may comprise one or more service areas, i.e. an area where services are offered by a single mobile exchange. The GSM service area in turn may be divided into one or more location areas covered by several radio cells. The cell is the smallest geographical area of the system, which comprises one or more fixed radio stations, i.e. base stations and within which predetermined traffic channels are used.

The national GSM network usually comprises a single home location register HLR, which is a database storing permanently the data of the mobile radio, such as location data. The system also contains several visitor location registers VLR, one or more for each service area. The visitor location register VLR is a database storing the data of the mobile radio while the mobile radio visits the area of the VLR. The VLR knows the location of the mobile radio MS with the accuracy of one location area. The HLR in turn knows which VLR area the mobile radio MS visits and provides MS terminating calls with routing data to the telephone network. The HLR in turn receives the required routing data from the VLR. The HLR and VLR have merely a signalling connection to other components in the mobile radio network.

For the sake of simplicity, the method according to the invention will be described with reference to its application in the system shown in FIG. 1, where each service area has a dedicated visitor location register VLR connected to the mobile exchange MSC of the respective service area. FIG. 1 shows two service areas, one of which comprises a mobile exchange MSC1 and a visitor location register VLR1, while the other comprises a mobile exchange MSC2 and a visitor location register VLR2. Each service area contains one or more location areas, and traffic is controlled within each location area by a base station controller BSC, which controls several fixed radio stations i.e. base stations BTS. Each one of the above-mentioned radio cells comprises a single base station BTS, and a single base station controller BTC provides services for several cells. A mobile radio MS residing in the cell establishes a two-way radio connection with the base station BTS of the cell. Both a signalling connection and speech channels are established between the base station controller BSC and the mobile exchange MSC.

In FIG. 1, the unit MSC1 controls the base station controller BSC1, which in turn controls base stations BTS1 and BTS2. Correspondingly, the MSC2 within the other service area controls the location area comprising a base station controller BSC2 and base stations BTS3 and BTS4.

The GSM network is usually connected to other networks, such as a public switched telephone network PSTN, another mobile radio network PLMN, a packet-switched data network PSPDN or an ISDN via a certain mobile exchange called a gateway-MSC GMSC. One or more (or all) of the mobile exchanges of the network may operate as a GMSC. A speech channel connection can be switched from the GMSC to any other mobile exchange MSC of the network. The GMSC also has a signalling connection with the HLR. The HLR in turn has a signalling connection with the VLRs. Alternatively, the exchange of another data transmission system, such as an ISDN exchange, may also operate as a GMSC.

FIG. 1 further shows a B subscriber i.e. a mobile radio MS to which an A subscriber from within the mobile radio network or from outside the mobile radio network possibly attempts to establish a speech connection or send a short message. FIG. 1 also shows a HLR which restarts itself and sends a restart indication to the VLR1 and VLR2. The B subscriber MS may roam to another service area, and when it establishes the next radio connection with the BTS3 or BTS4, its location data are forwarded to the VLR2, where the data are available for the HLR when required.

FIG. 2 shows the HLR list in the VLR of the cellular radio system according to the invention, in which the identity HLR Addr of each HLR corresponds to the restart number HLR Reset Num of the same HLR. The VLR includes the HLR list and its values in its databases on the basis of the addresses of the HLRs belonging to the cellular radio network. When a certain HLR restarts, it sends a restart indication to the VLR1 and VLR2, which change the restart number of the HLR so that it differs from the preceding one, e.g. by incrementing or decrementing the number by one.

The subscriber data of the VLR according to the invention include the subscriber data listed in Table 1 in GSM 03.08 -Version 3.7.0 January 1991. *Organization of Subscriber Data*. ETSI/PT 12, p. 18., in addition to which the subscriber data according to the invention include the restart number of each subscriber, which the VLR compares with the HLR restart number in the HLR list when it receives from the mobile exchange MSC an indication that the radio connection to the subscriber MS has been established and initiates the updating of the subscriber data of the subscriber both in the VLR and in the HLR as described in GSM 09.02, Section 5.2.1.2.3., FIG. 5.2.5. As a result of the comparison, the subscriber data are updated if the subscriber-specific restart number is unequal to the HLR restart number HLR Reset Num. Alternatively, the subscriber location data are not updated if the subscriber-specific restart number is equal to the HLR Reset Num.

FIG. 3 illustrates in detail the VLR of the cellular radio system according to the invention. The HLR1 restarts as described in GSM 03.07 - Version 3.2.1. February 1992. *Restoration Procedures*. ETSI/PT 12, Sections 3.2.1. and 3.2.2. (p. 8 and 9), and notifies the VLRs of the cellular radio network about the restart by sending a restart indication HLR Reset. A means 2 for receiving the HLR Reset message in the VLR is described in part in GSM 09.02 - Version 3.8.0. January 1991. *Mobile Application Part Specification DCS*. ETSI/TC. 507 pages, FIG. 5.8.7, p. 277. The solution according to the invention differs from that shown in the prior art figure in that the HLR Reset message receiving means 2 according to the invention does not set the Radio Confirmation Indicator and the HLR Confirmation Indicator of the subscriber to the not confirmed state, but it sends a message 3 to the HLR List 3a of the VLR so as to change the restart number HLR Reset Num of the concerned HLR, as described in greater detail in FIG. 2.

When the mobile radio MS 17 establishes a radio connection 19 with the cellular radio network via the base station BTS 16, the mobile exchange MSC 14 sends one of the commands indicated in FIG. 5.8.5. of GSM 09.02, i.e. PAGING RESPONSE, UPDATE LOCATION AREA, PROCESS ACCESS REQUEST or ATTACH IMSI, to the VLR 20. The VLR comprises a means 5 for processing events from the mobile radio (described in part in GSM 09.02, Section 5.2.1.3.2., from p. 27 onwards). The means 5 processes events from the mobile radio and starts 6 a comparator means 7. The comparator means 7 reads the subscriber-specific restart number according to the invention from the subscriber data 10 of the VLR (the prior art subscriber data appear from GSM 03.08, Table 1), and compares it with the restart number HLR Reset Num of the respective HLR in the HLR List 3a of the VLR. If the subscriber-specific restart number differs from the subscriber's restart number stored in the HLR list, the comparator means 7 initiates 18 location updating 12 of the subscriber in compliance with GSM 09.02, Section 5.2.1.3.2., and changes 13 the subscriber-specific restart number 10 so that it is equal to the restart number HLR Reset Num of the HLR List. As a consequence, the data of the subscriber need not be updated after this updating.

The subscriber data list 10 and the HLR list 3a of the VLR in the cellular radio system according to the invention are typically implemented by software as databases. The means 2, 3a provided in the VLR for processing the HLR restart indication HLR Reset and the means 5, 7, 12 performing the other above-mentioned functions are typically implemented by software.

The drawings and the description related to them are merely intended to illustrate the idea of the invention. In their details the method according to the invention for updating subscriber data in a cellular radio network and a cellular radio system updating subscriber data may vary within the scope of the claims. Even though the invention has been described above mainly in connection with the GSM system, the inventive ideas disclosed in the claims may be applied in other type of radio systems as well.

I claim:

1. Method for updating subscriber data in a cellular radio system, comprising a home location register and a visitor location register, the method comprising the following steps:

a home location register restart indication indicating that the home location register has restarted is received from the home location register;

a subscriber-specific restart number is included in the subscriber data of the visitor location register;

a home location register list is included in the visitor location register, each home location register identity having an associated home location register restart number in said home location register list;

the visitor location register changes the restart number of the home location register which sent the restart indication in the home location register list of the visitor location register;

when the visitor location register receives from a mobile exchange an indication of the establishment of a radio connection with a subscriber, the visitor location register compares the subscriber-specific restart number of the subscriber with the home location register restart number of the subscriber, and initiates the updating of the location data of the subscriber in the home location register if required on the basis of the comparison.

2. Method according to claim 1, wherein the subscriber location data are updated when the subscriber-specific restart number is unequal to the home location register restart number.

3. Method according to claim 1, wherein the subscriber data are not updated when the subscriber-specific restart number is equal to the home location register restart number.

4. Cellular radio system comprising a subscriber data list containing subscriber data and a subscriber-specific restart number;

a home location register list where the identity of each home location register corresponds to the restart number of the home location register;

means for processing the home location register restart indication sent by the home location register and changing the home-location-register-specific restart number included in the home location register list in response to the restart indication sent by the home location register;

means for comparing the subscriber-specific restart number included in the subscriber data list with the home-location-register-specific restart number included in the home location register list in response to an indication sent by a mobile exchange so as to indicate that a radio connection has been established with the subscriber, and initiating the updating of the subscriber data of the subscriber in the home location register if required on the basis of the comparison.

* * * * *